United States Patent Office 3,380,975
Patented Apr. 30, 1968

3,380,975
VINYL HALIDE RESINS CONTAINING OXAZOLINE HEAT STABILIZERS
Robert F. Purcell, Terre Haute, Ind., assignor to Commercial Solvents Corporation, New York, N.Y., a corporation of Maryland
No Drawing. Filed July 7, 1966, Ser. No. 563,352
11 Claims. (Cl. 260—80.72)

ABSTRACT OF THE DISCLOSURE

Heat stable vinyl halide resin compositions obtained by polymerizing a vinyl halide monomer, for example, vinyl chloride, or an admixture containing a major portion of a vinyl halide monomer and a minor portion of a monomer copolymerizable therewith with an oxazoline of the formula

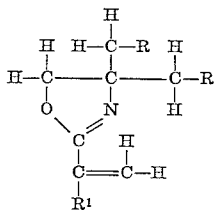

wherein R is the radical

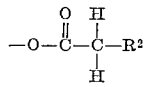

hydrogen, a lower alkyl radical having 1 up to about 3 carbon atoms and hydroxyl, $R^1$ is an alkyl radical having 1 up to about 25 carbon atoms and $R^2$ is hydrogen or an alkyl radical having 1 up to about 25 carbon atoms. Examples of such oxazolines include 2-isopropenyl-4,4-dimethyl-2-oxazoline and 2-(1-heptylvinyl) - 4,4 - bis(hydroxymethyl)-2-oxazoline.

---

The present invention relates to heat stabilized vinyl halide resin compositions and to a process for preparing said compositions. In a particular aspect, this invention relates to heat stabilized vinyl halide resin compositions containing as stabilizers an oxazoline of the formula

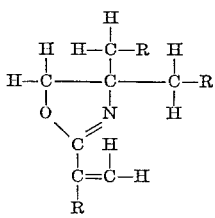

wherein R is a radical selected from the group consisting of

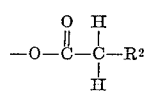

hydrogen, lower alkyl having 1 up to about 3 carbon atoms and hydroxyl; and $R^1$ is an alkyl radical having from 1 to about 25 carbon atoms and $R^2$ is a radical selected from the group consisting of hydrogen and alkyl having from 1 up to about 25 carbon atoms. In a further aspect, this invention relates to a process for the preparation of heat stabilized vinyl halide resin compositions by polymerizing in a polymerization medium a vinyl halide monomer and a stabilizing amount of an oxazoline of the formula

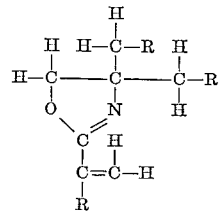

wherein R and R' are defined as above.

As employed herein, the term "vinyl halide resin" is synonomous with the term "vinyl halide polymerization composition" and is meant to include those resins containing a major portion of vinyl halide prepared by the polymerization of vinyl halide or vinyl halide in conjunction with other polymerizable monomers such as vinylidine chloride, acrylonitrile, styrene, vinyl esters or aliphatic acids, for example dialkyl fumarate and maleate. The vinyl halide concerned with is typically and preferably vinyl chloride although the other halides such as the bromide and the fluoride are also contemplated.

Vinyl halide polymers in general are well known to the art and their valuable properties are widely recognized. Vinyl chloride polymers in particular are useful in thermoplastic compositions such as films, bottles, coatings, sheets, tubes, fibers and covering for wire and cable. Vinyl chloride polymers are particularly useful as coatings for the interior surface of metal cans used in the packaging of beer, malt liquors, carbonated beverages and other foodstuffs since such coatings impart no off odor or flavor to the contents of the can; the coatings provide an inert barrier between the metal of the can and its contents; and the coatings are tough and flexible permitting them to withstand vigorous can forming and handling operations.

It is well known that vinyl halide polymers are subject to degradation upon heating. Degradation is evidenced by general discoloration of the normally clear, colorless polymer and in extreme cases by charring and disintegration of the polymer. This lack of thermal stability presents a serious obstacle to the commercial application of vinyl halide polymers since preferred methods of forming articles from vinyl halide polymers typically involve the use of heat. Discoloration is a serious drawback when it is desired to manufacture the polymer into an article of a white or a light pastel color. Currently, it is believed that degradation of vinyl halide polymers is primarily caused by the splitting off of a hydrogen halide, for example hydrogen chloride, from the vinyl halide molecule.

It is also well known that thermal degradatian of vinyl halide polymers is increased when certain metals, such as iron, are present in the polymer system or when the polymer is in contact with such a metal as for example when the polymer serves as a coating for a metal surface, such as the interior of a metal can.

It is an object of the present invention to provide heat stabilized vinyl halide resin compositions.

It is a further object of the present invention to provide heat stabilized vinyl halide resin compositions which are resistant to degradation when in contact with metals such as iron.

An additional object of the present invention is the provision of a process for the preparation of heat stabilized vinyl halide resin compositions.

Other objects and advantages of the present invention will be apparent from the specification and appended claims.

The invention is based on the discovery that oxazolines of the formula

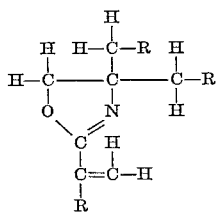

wherein R and R' are defined as above serve as stabilizers for vinyl halide resins. Examples of such oxazolines include 2-isopropenyl-4-hydroxymethyl-4-ethyl-2-oxazoline, 2-isopropenyl-4-propionyloxymethyl-4-ethyl-2 - oxazoline, 2-isopropenyl-4,4-dimethyl-2-oxazoline, 2-isopropenyl-4,4-dimethyl-2-oxazoline, 2-isopropenyl-4 - hydroxymethyl-4-methyl-2-oxazoline, 2-isopropenyl-4-propionyloxymethyl-4-methyl-2-oxazoline, 2-isopropenyl - 4,4 - bis(hydroxymethyl)-2-oxazoline, 2-isopropenyl-4,4-bis(propionyloxymethyl)-2-oxazoline, 2-isobutenyl - 4 - hydroxymethyl-4-ethyl-2-oxazoline, 2-(1-hexadecylvinyl) - 4,4 - bis(stearyloxymethyl)-2-oxazoline, 2-(1-hexadecylvinyl)-4,4-bis(hydroxymethyl)-2-oxazoline, 2-(1-eicosylvinyl)-4,4-dimethyl-2-oxazoline, 2-(1-heptylvinyl) - 4,4 - bis(hydroxymethyl)-2-oxazoline, etc. and the like. The oxazolines used in the present invention are commercially available and may be obtained by the reaction of an aminohydroxy compound, an organic carboxylic acid and an aldehyde. A method for preparing such oxazolines is disclosed in application Ser. No. 254,010 filed Jan. 25, 1963, for H. L. Wehrmeister and H. I. Yalowitz, now abandoned.

The stabilized vinyl halide resin compositions of the present invention are prepared by effecting the polymerization in a polymerization medium of a vinyl halide monomer or a vinyl halide monomer in admixture with a monomer copolymerizable therewith wherein the vinyl halide monomer comprises a major portion of the admixture, in the presence of one or more of the above defined oxazolines. Methods for the polymerization of vinyl halide monomers are well known to the art. Such methods include the well-known bulk, solution, emulsion and suspension polymerization techniques. The polymerization is generally conducted at a temperature of from about 30 to about 80° C. for a period of from about 12 to about 48 hours in the presence of a suitable polymerization catalyst. Suitable polymerization catalysts are well known to the art and include lauroyl peroxide, benzoyl peroxide, potassium persulfate, t-butyl peroxide and the like. Amounts of polymerization catalyst in the range of from about 0.05 to about 0.5% by weight based on the weight of polymerizable material in the polymerization medium are typically employed.

The amount of oxazoline used in the preparation of the compositions of the present invention should be sufficient to stabilize the vinyl halide resin against heat degradation. Generally, amounts of oxazoline of from about 0.5 to about 30% by weight based on the weight of the vinyl halide monomer may be utilized. Preferred amounts are in the range of from about 1 to about 20% by weight.

The compositions of this invention may be formulated with conventional ingredients, such as for example plasticizers, such as dicoctyl phthalate, isoctanol, 3,5,5-trimethyl hexanol and the like; pigments such as titanium dioxide; fillers and extenders such as calcium carbonate, etc.

The vinyl halide resin compositions provided by the present invention may be used for those purposes in which vinyl halide polymers are employed. For example, they may be used in the form of films, bottles, coatings, sheets, tubes, fibers and coverings for wire and cable. In particular, the vinyl chloride resin compositions of the present invention are especially useful as coatings for the interior surface of metal cans.

In addition to heat stabilization the vinyl halide resin compositions of the present invention possess other advantages over unmodified vinyl halide resins. Such advantages include internal plasticization, improved adhesion properties, improved pigment wetting properties and improved dye acceptance properties. Where internal plasticization is desired it is preferred to use an oxazoline wherein either the R substituent, $R^2$ substituent and/or one or both of the R substituents is an alkyl radical having 6 or more carbon atoms.

The invention will be understood more fully by reference to the following specific examples. It is understood that the examples are presented for purposes of illustration only and are not intended as a limitation of the invention.

Example 1

A. An aqueous emulsion of a vinyl chloride polymerization composition was obtained by heating a polymerization mixture having the following ingredients at 50° C. for 24 hours.

| Ingredients: | Parts by weight |
|---|---|
| Vinyl chloride monomer | 24.0 |
| 2 - isopropenyl - 4,4 - dimethyl - 2 - oxazoline | 1.25 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

The resulting aqueous emulsion was coagulated by the addition thereto of acetic acid. The vinyl chloride polymerization composition was then separated from the coagulated emulsion by centrifugation and decantation and the separated polymerization composition was washed first with water and then with methanol. A dry vinyl chloride resin composition was obtained.

To illustrate the thermal stability of vinyl chloride polymer compositions containing 2 - oxazoline the following test was conducted: 5 g. of the vinyl chloride polymer composition prepared above was dissolved in 32 mls. of tetahydrofuran. Films of the polymeric composition were then cast from solution on a series of 4" x 8" polished steel panels. The films were then cured in an oven for 20 minutes at 350° F. Hard, clear films were obtained. No discoloration of the films occurred. The films adhered tenaciously to the metal plates.

B. For comparative purposes the above procedure was repeated in all essential details with the exception that no oxazoline was included as an ingredient in the vinyl chloride polymerization composition. Films obtained from the vinyl chloride polymerization composition were discolored and were easily separated from the steel plates.

The ability of 2 - isopropenyl - 4,4 - dimethyl - 2 - oxazoline to stabilize vinyl chloride resin compositions against thermal degradation in the presence of metal is shown by the above comparison.

Example 2

A vinyl chloride resin composition was prepared according to the method of Example 1 from the following ingredients:

| Ingredients: | Parts by weight |
|---|---|
| Vinyl chloride monomer | 20.0 |
| Vinyl acetate monomer | 3.8 |
| 2 - isopropenyl - 4 - hydroxymethyl - 4 - ethyl-2 - oxazoline | 0.61 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

Clear, stable films were obtained from the above composition. The films exhibited good adherence to metal.

Example 3

A vinyl chloride resin composition was prepared according to the method of Example 1 from the following ingredients:

| Ingredients: | Parts by weight |
| --- | --- |
| Vinyl chloride monomer | 24.0 |
| 2 - isopropenyl - 4 - propionlyoxymethyl - 4 - ethyl - 2 - oxazoline | 1.25 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

Clear, stable films were obtained from the above composition. The films exhibited good adherence to metal.

Example 4

A vinyl chloride resin composition was prepared according to the method of Example 1 from the following ingredients:

| Ingredients: | Parts by weight |
| --- | --- |
| Vinyl chloride monomer | 24.0 |
| 2 - isopropenyl - 4 - propionyloxymethyl - 4 - methyl - 2 - oxazoline | 1.25 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

Clear, stable films were obtained from the above composition. The films exhibited good adherence to metal.

Example 5

A vinyl chloride resin composition was prepared according to the method of Example 1 from the following ingredients:

| Ingredients: | Parts by weight |
| --- | --- |
| Vinyl chloride monomer | 20.0 |
| Vinyl acetate monomer | 3.8 |
| 2 - isopropenyl - 4 - hydroxymethyl - 4 - methyl - 2 - oxazoline | 0.61 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

Clear, stable films were obtained from the above composition. The films exhibited good adherence to metal.

Example 6

A vinyl chloride resin composition was prepared according to the method of Example 1 from the following ingredients:

| Ingredients: | Parts by weight |
| --- | --- |
| Vinyl chloride monomer | 24.0 |
| 2-isopropenyl - 4,4 - bis(hydroxymethyl)-2-oxazoline | 1.25 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

Clear, stable films were obtained from the above composition. The films exhibited good adherence to metal.

EXAMPLE 7

A vinyl chloride resin composition was prepared according to the method of Example 1 from the following ingredients:

| Ingredients: | Parts by weight |
| --- | --- |
| Vinyl chloride monomer | 24.0 |
| 2 - isopropenyl - 4,4 - bis(propionyloxymethyl)-2-oxazoline | 1.25 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

Clear, stable films were obtained from the above composition. The films exhibited good adherence to metal.

EXAMPLE 8

A vinyl chloride resin composition was prepared according to the method of Example 1 from the following ingredients:

| Ingredients: | Parts by weight |
| --- | --- |
| Vinyl chloride monomer | 24.0 |
| 2-(1-heptylvinyl) - 4,4 - bis(hydroxymethyl)-2-oxazoline | 1.25 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

Clear, stable films were obtained from the above composition. The films exhibited good adherence to metal.

Since many embodiments may be made in this invention, and since many changes may be made in the embodiments described, the foregoing is to be interpreted as illustrative only and the invention is defined by the claims appended hereto.

I claim:

1. A vinyl halide resin composition stabilized against heat degradation obtained by polymerizing a member selected from the group consisting of vinyl halide monomer and admixtures of vinyl halide monomer and a monomer copolymerizable therewith, said admixtures containing a major portion of vinyl halide, in a polymerization medium with from about 0.5 to about 30% by weight based on the weight of the vinyl halide monomer of an oxazoline of the formula

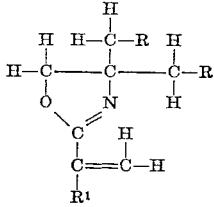

wherein R is a radical selected from the group consisting of

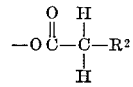

hydrogen, lower alkyl having 1 up to about 3 carbon and hydroxyl, $R^1$ is an alkyl radical having from 1 up to about 25 carbon atoms and $R^2$ is a radical selected from the group consisting of hydrogen and alkyl having from 1 up to about 25 carbon atoms.

2. The composition of claim 1 wherein the vinyl halide is vinyl chloride.

3. The composition of claim 2 wherein the oxazoline is 2-isopropenyl-4,4-dimethyl-2-oxazoline.

4. The composition of claim 2 wherein the oxazoline is 2-(1-heptylvinyl)-4,4-bis(hydroxymethyl)-2-oxazoline.

5. The composition of claim 2 wherein the oxazoline is 2-isopropenyl-4,4-bis(hydroxymethyl)-2-oxazoline.

6. The composition of claim 2 wherein the oxazoline is 2-isopropenyl-4-propionyloxymethyl - 4 - methyl-2-oxazoline.

7. The composition of claim 2 wherein the oxazoline is 2-isopropenyl-4,4-bis(propionyloxymethyl)-2-oxazoline.

8. The composition of claim 2 wherein the amount of oxazoline is in the range of from about 1 to about 20% by weight based on the weight of the vinyl chloride.

9. A process for the production of heat stabilized vinyl halide resin compositions which comprises polymerizing a member selected from the group consisting of vinyl halide monomer and admixtures of vinyl halide monomer and a monomer copolymerizable therewith, said admixtures containing a major portion of vinyl halide, in a polymerization medium with from about 0.5 to about 30% by weight based on the weight of the vinyl halide monomer of an oxazoline of the formula

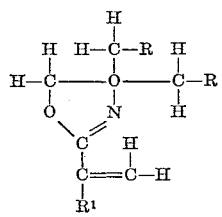

wherein R is a radical selected from the group consisting of

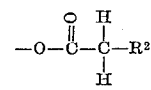

lower alkyl having 1 up to about 3 carbon atoms, hydroxyl and hydrogen, $R^1$ is an alkyl radical having 1 up to about 25 carbon atoms and $R^2$ is a radical selected from the group consisting of hydrogen and alkyl having 1 up to about 25 carbon atoms.

10. The process of claim 9 wherein the vinyl halide is vinyl chloride.

11. The process of claim 9 wherein the amount of oxazoline is in the range of from about 1 to about 20% by weight based on the weight of the vinyl chloride.

References Cited

UNITED STATES PATENTS

| | | | |
|---|---|---|---|
| 2,897,182 | 7/1959 | De Benneville et al. | 260—80.5 |
| 3,208,981 | 9/1965 | Miranda et al. | 260—78.5 |
| 3,325,446 | 6/1967 | Chang et al. | 260—45.8 |

DONALD E. CZAJA, *Primary Examiner.*

M. J. WELSH, *Assistant Examiner.*

UNITED STATES PATENT OFFICE
CERTIFICATE OF CORRECTION

Patent No. 3,380,975                            April 30, 1968

Robert F. Purcell

It is hereby certified that error appears in the above numbered patent requiring correction and that the said Letters Patent should read as corrected below.

Column 2, line 23, "or" should read -- of --; line 32, "covering" should read -- coverings --. Column 3, line 63, "dicoctyl phthalate, isoctanol" should read -- dioctyl phthalate, isooctanol --. Column 4, line 7, "R" should read -- $R^1$ --. Column 7, lines 22 to 30, the formula should appear as shown below :

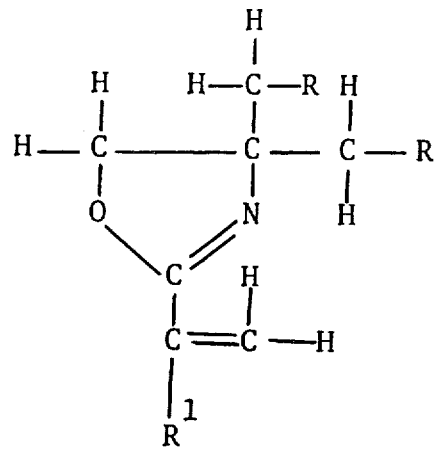

Signed and sealed this 16th day of September 1969.

(SEAL)
Attest:

EDWARD M. FLETCHER, JR.                  WILLIAM E. SCHUYLER, JR.
Attesting Officer                            Commissioner of Patents